United States Patent [19]

Crockett

[11] 4,005,782
[45] Feb. 1, 1977

[54] PICKER

[75] Inventor: Robert R. Crockett, Westfield, Mass.

[73] Assignee: Engineered Metal Products Company, Inc., Chicopee, Mass.

[22] Filed: Oct. 31, 1975

[21] Appl. No.: 627,768

Related U.S. Application Data

[63] Continuation-in-part of Ser. No. 447,667, March 4, 1974, Pat. No. 3,921,820.

[52] U.S. Cl. .............................................. 214/1 BB
[51] Int. Cl.$^2$ .......................................... B25J 9/00
[58] Field of Search ............ 214/1 BB, 1 CM, 1 BT

[56] References Cited

UNITED STATES PATENTS

| | | | |
|---|---|---|---|
| 3,075,651 | 1/1963 | Kaden | 214/1 BB |
| 3,178,040 | 4/1965 | Nelson | 214/1 BB |
| 3,770,140 | 11/1973 | Dukette | 214/1 BB |
| 3,921,820 | 11/1975 | Crockett | 214/1 BB |

*Primary Examiner*—Milton S. Mehr
*Attorney, Agent, or Firm*—Finnegan, Henderson, Farabow & Garrett

[57] ABSTRACT

A picker for removing articles from a remote location, including an open frame carrier secured to a molding machine for linear movement along support rods in a direction perpendicular to the direction of movement of one of the mold platens, i.e., a Y-axis direction, under control of a first fluid cylinder. The carrier, in turn, mounts a carriage for linear movement in a direction normal thereto, i.e. an X-axis direction, under the control of a second fluid cylinder. The carriage includes a third fluid cylinder for controlling linear movement in a third direction perpendicular to the first and second directions, i.e. a Z-axis direction. Depending from the carriage is a gripping unit coupled to the third cylinder, the gripping unit including a picker arm under control of a fourth fluid cylinder for movement in the X-axis direction and which picker arm terminates at its inner end in a pair of jaws or fingers, the opening and closing of which are under control of a fifth cylinder. The carriage also includes a mechanism for rotating the picker arm about the Z-axis. A limit switch is mounted on the mold machine for actuation when the movable mold platen obtains its open position. Actuation of the limit switch initiates the operation of the logic circuit, which automatically controls the operation of the picker, by operating the fluid cylinders in a predetermined sequence, thereby removing the article from a remote location and then returning the picker to its initial state.

9 Claims, 3 Drawing Figures

PICKER

BACKGROUND OF THE INVENTION

Related Applications

This application is a continuation-in-part of my co-pending application, Ser. No. 447,667, filed Mar. 4, 1974, now U.S. Pat. No. 3,921,820.

Field of the Invention

The present invention relates to an apparatus for retrieving articles from remote locations and more particularly relates to a picker for moving between the open mold platens in a molding machine and grasping articles, for example sprue runners, from between such mold platens.

DESCRIPTION OF THE PRIOR ART

As will be appreciated, articles, i.e. sprue runners, are very often located between the open mold platens in a molding machine. Sprue runners, particularly, can cause substantial damage to the molding machine if left between the platens. These articles can be removed manually. However, such attempts at manual removal are wrought with danger. For example, there is a very great danger of getting limbs caught between mold platens.

Prior mechanical apparatus for automatically retrieving articles from between mold platens have been proposed and constructed in the past. Many such units are complex, require a large amount of space for their operation, are time consuming and require combinations of various types of power inputs, for example, electrohydraulic operation. Other types provide only for movement in one linear direction and have various ancillary problems in their construction, including a lack of capability for adaption to a variety of different sized molding machines, a tendency to wear, which in turn deleteriously affects the repeatability of such machines, and generally complicated movements and operation.

SUMMARY OF THE INVENTION

The present invention provides a picker for removing articles from between the mold platens of molding machines, which minimizes or eliminates the problems associated with the aforementioned and other types of article retrieval apparatus for use with molding machines and provides a novel and improved picker for use in retrieving articles from between mold platens having various advantages in construction, mode of operation and use in comparison with such prior retrieval apparatus. The present invention, thus solves many of the problems and shortcomings associated with prior retrieval-type apparatus for this purpose and particularly comprises a picker, which can be utilized automatically, and therefore, without the danger involved in manually retrieving articles from between mold platens. Furthermore, the present picker has definite repeatability in operation, is capable of moving its operating jaws in the X, Y and Z directions, is reliable since it utilizes fluid drive systems which are simple in constructions and readily controlled, and is easily adapted for use with molding machines of various sizes. More particularly, the picker hereof comprises a carrier, which is mounted to the movable platen of the molding machine for movement in a direction perpendicular to the direction of movement of the movable mold platen, i.e., in the Y-axis direction. The carrier is initially mounted such that the operating jaws carried thereby are within a predetermined distance in the Y-direction from the articles to be picked from between the mold platens. A first air cylinder is provided between the mount and the carrier for moving the carrier in the Y-direction. The carrier includes an open frame housing slidably mounted on a pair of rods, a carriage for movement in a direction normal to the direction of movement of the carrier, i.e. in the X-axis direction. A second air cylinder controls the movement of the carriage. Depending from the carriage is a gripping unit, which includes a picker arm. The carriage includes a third cylinder for moving the gripping unit in a direction perpendicular to the X and Y directions, i.e., the Z direction, and the carriage also includes a mechanism for rotating the picker arm about the Z-axis. The picker arm is under the control of a fourth air cylinder for movement in the X-direction. At the distal end of the picker arm there is provided a pair of pivoted jaws, which open and close under the control of a fifth cylinder. With the foregoing described arrangement, the jaws are movable in the X-direction under control of the second and fourth cylinders, movable with the carrier in the Y-direction under control of the first cylinder and movable in the Z-direction under control of the third cylinder. An air logic circuit is provided for controlling the actuation of the various cylinders in a manner set forth below.

In utilizing the picker hereof, a limit switch is secured to the molding machine adjacent the full open position of the movable platen for actuation in response to the platen, obtaining its full open position. The limit switch actuates a solenoid valve, which opens to allow fluid to be supplied to the control input of a logic element in the logic circuit. This initiates the logic sequence, which automatically controls the operation of the fluid cylinders, thereby moving the picker into position where it can engage and hold the article in the molding machine, remove the article, release the article at a predetermined position and then return the cylinders to their initial positions.

Accordingly, it is a primary object of the present invention to provide a novel and improved picker for removing articles from between the mold platens of molding machines.

It is another object of the present invention to provide a novel and improved picker for removing articles from between the mold platens of molding machines, and wherein such picker provides picker jaws movable along the X, Y and Z axes.

It is still another object of the present invention to provide a novel and improved picker for removing articles from between the mold platens of molding machines, wherein the picker is reliable and repeatable in operation, adapted for use with molding machines of various sizes, readily and easily constructed, and more reliable in operation.

It is a further object of the present invention to provide a novel and improved picker for removing articles from between the mold platens of molding machines and which picker can be operated automatically without the need for any intervening human element.

It is still a further object of the present invention to provide a novel and improved picker for retrieving articles from between the mold platens of a molding machine and which is readily adaptable for use with machines of various sizes, due to the simplicity of its construction and operation.

It is also a further object of the present invention to provide a novel and improved picker for removing articles between the mold platens of a molding machine in which the operation of the picker is automatically controlled by a logic circuit.

BRIEF DESCRIPTION OF THE DRAWINGS

These and further objects and advantages of the present invention will become more apparent upon reference to the following specification, appended claims and drawings, wherein:

DESCRIPTION OF THE PREFERRED EMBODIMENT

Figure 1:
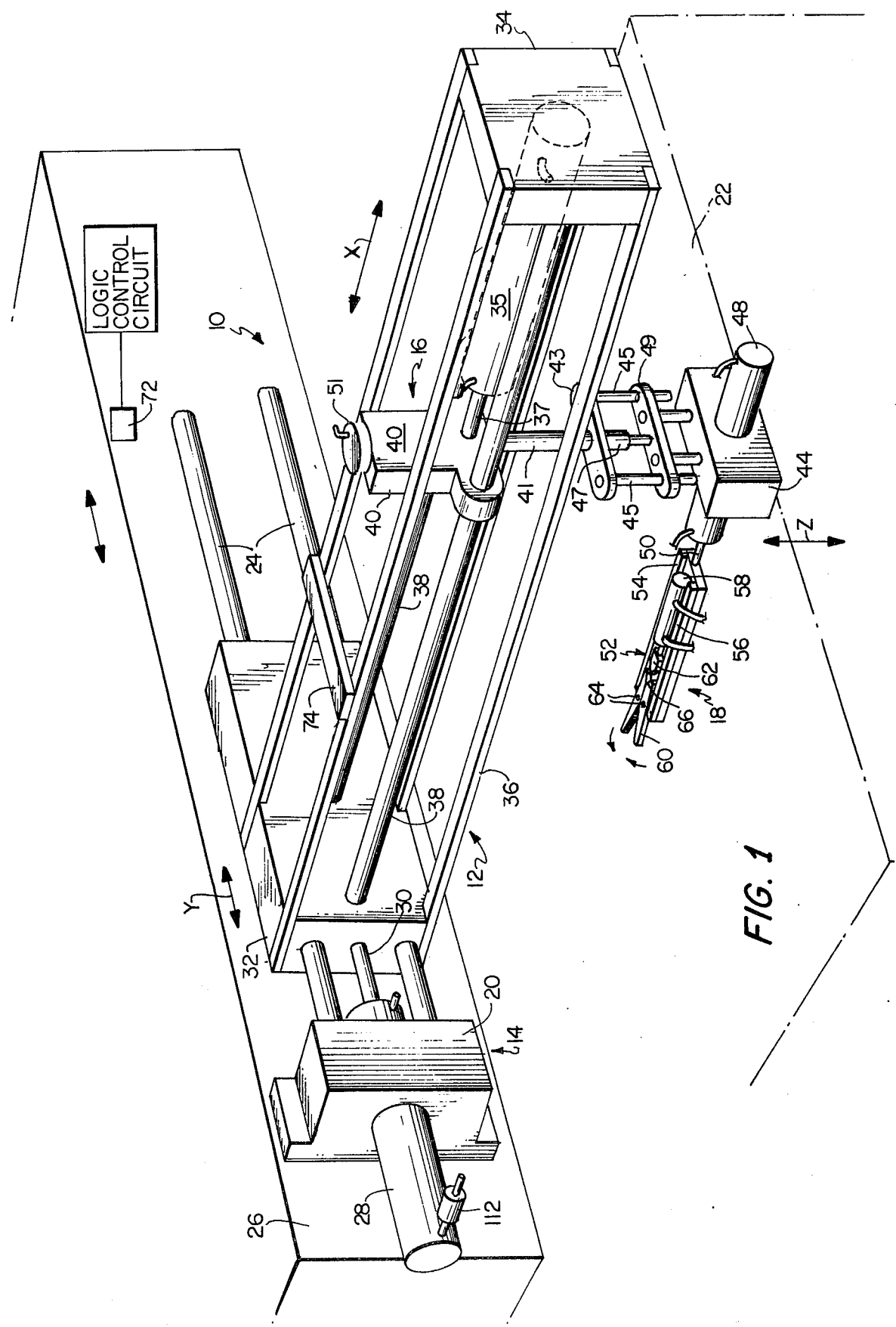
FIG. 1 is a perspective view of a picker constructed in accordance with the present invention.
Figure 2:
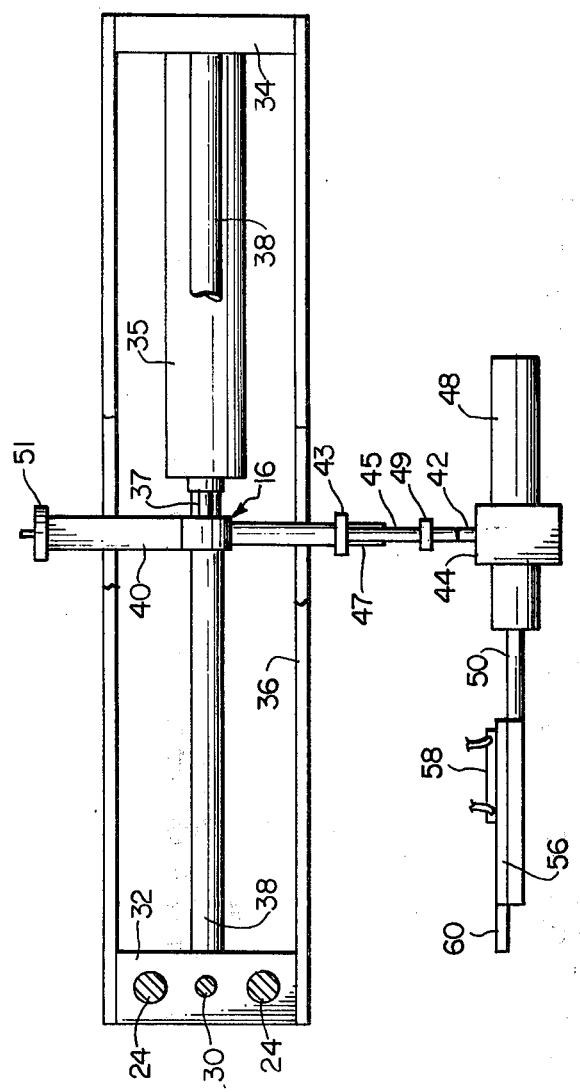
FIG. 2 is a side elevational view thereof.

Referring now to FIG. 1, there is illustrated a picker constructed in accordance with the present invention and generally designated 10 comprising a carrier generally designated 12 secured for linear sliding movement in opposite directions on a picker mounting unit generally designated 14, the carrier 12 being movable generally in opposite directions along a path parallel to the Y-axis designated by the arrows in FIG. 1. Carrier 12, in turn, mounts a carriage generally designated 16 for linear sliding movement in opposite directions along a path parallel to the X-axis also indicated by the arrows in FIG. 1. Carriage 16, in turn, mounts a gripping unit generally designated 18 for movement in the Z-direction as well as for movement with the carriage 16 and carrier 12. Mounting unit 14 includes a mounting block 20, which when the picker 10 hereof is utilized in conjunction with a molding machine, is secured preferably on top of the movable mold platen 26 of such machine. Block 20 carries a pair of vertically spaced guide rods 24, which when picker 10 is secured to the molding machine, extend perpendicular to the direction of movement of the movable mold platen 26, it being appreciated from a review of FIG. 1 that the movable mold platen 26 of the molding machine moves linearly in opposite directions along a path parallel to the Z-axis. Accordingly, picker 10 is preferably mounted on top of the molding machine with the gripping unit 18 carried for movement along paths parallel to the X, Y and Z axes, whereby the gripping unit 18 is receivable between mold platens 22 and 26 when the mold platens are open and retractable therefrom when closed in the manner described below. The mounting block 20 also carries a fluid, preferably pneumatically, actuated cylinder 28, the piston rod 30 of cylinder 28 being secured to an end plate 32 of the carrier unit 12. Carrier unit 12 is supported by end plate 32, which in turn is bored to receive guide rods 24, whereby carrier unit 12 is slidably mounted for movement in the Y-direction along and supported from guide rods 24. Accordingly, it will be appreciated that extension and retraction of piston 30 of cylinder 28 linearly slidably moves carrier 12 along guide rods 24 in opposite directions along a path parallel to the Y-axis.

Carrier 12 is comprised of an elongated open frame housing having plates 32 and 34 at opposite ends with support bars or stringers 36 extending longitudinally in the X-direction between the end plates. Also extending between end plates 32 and 34 are a pair of longitudinally spaced guide rods 38. Carriage 16 includes an upper generally inverted T-shaped mounting element 40, which is suitably bored along its lower flanges to receive guide rods 38, whereby carriage 16 is mounted for linear sliding movement in the X-direction relative to carrier 12. Also secured to end plate 34 is a fluid, preferably pneumatically, actuated cylinder 35 whose piston rod 37 is secured to element 40. Accordingly, extension and retraction of piston rod 37 from cylinder 35 displaces element 40 and the gripping unit 18 carried thereby in a manner described below linearly along guide rods 38 in the X-direction.

Depending from element 40 is a bar 41, which has a member 43 fixed thereto. Vertically extending from member 43 are laterally spaced guide rods 45, the rods 45 extending below carrier 12 between the lower pair of stringers 36. Cylinder 47 and guide rods 45 connect member 49 to member 43. A mounting block 44 for gripping unit 18 is received on the depending guide rods 42 and can be raised and lowered in the Z-direction by operation of cylinder 47. Carriage 16 also includes a ROTAC 51 mounted on element 40 for rotating as a unit elements 41, 43, 45, 47, 49 and 42 about the Z-axis, thereby providing for the rotation of gripper 18 about the Z-axis. The maximum rotation of gripper 18 is 90°. Block 44 carries a fluid, preferably pneumatic, actuated cylinder 48, the piston rod 50 of which is secured to gripping unit 18. With the arrangement previously described, it will be appreciated that actuation of cylinder 48 to extend or retract piston rod 50 extends and retracts the gripping unit 18 in the X-direction respectively between the open mold faces 22 and 26 and to one side thereof.

The gripping unit 18 includes a housing 52 having a side plate 54 to which piston rod 50 is coupled and a pair of upper and lower bars 56 defining a recess in which a fluid, preferably pneumatically, actuated cylinder 58 and gripping fingers 60 of gripping unit 18 are disposed. The piston rod of cylinder 58 carries a wedge 62. The fingers 60 are pivoted intermediate their ends, about axes 64 and have cam surfaces 66 inwardly of their pivotal axes 64 which bear against the respective opposite sides of wedge 62. A spring, not shown, normally biases the fingers in the normally open position shown in FIG. 1. When the cam surfaces 66 are engaged by wedge 62, the fingers are pivoted about axes 64, resulting in the closing of the fingers. The inner faces of fingers 60 adjacent their outer ends are serrated to provide a gripping surface. It will be appreciated that extension and retraction of the piston rod of cylinder 58 causes fingers 60 to respectively move from their normally open position to a closed position and from the closed position to their normally opened position under the bias of the spring.

A fluid logic circuit control system is provided for coordinating the various movements afforded by the cylinders in a manner such that gripping unit 18 can move to a location between the mold platens when the mold platens are opened, grip the article to be moved, and withdraw with the article from between the mold platens and deposit the article at a designated location.

Figure 3:
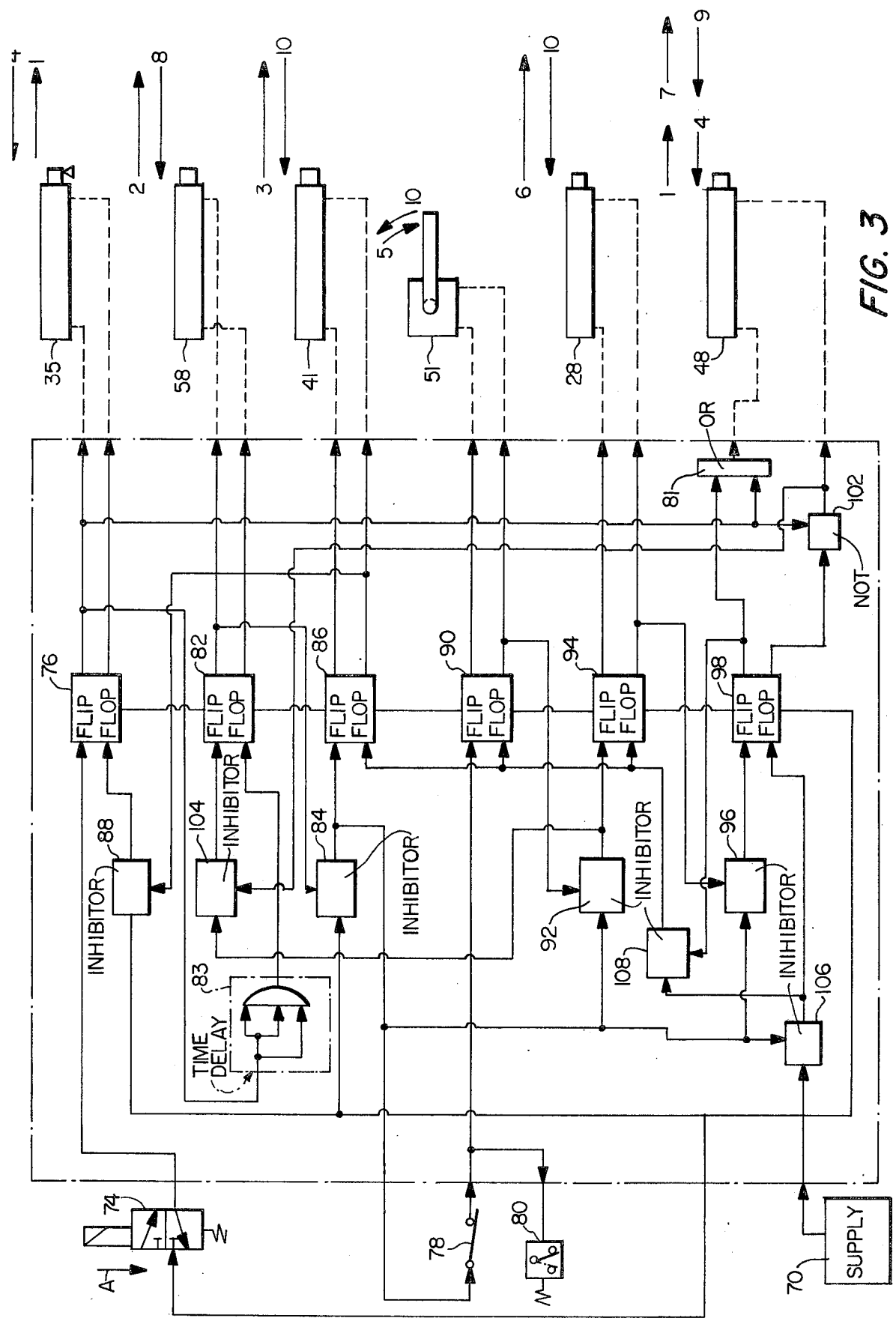
FIG. 3 is a schematic illustration of a logic circuit for controlling the picker in accordance with the present invention.

FIG. 3 illustrates the logic circuit for controlling the cylinders, which operate the gripper. Fluid supply 70 provides the fluid for operating the logic elements, as well as the cylinders 35, 58, 41, 28 and 48 and ROTAC 51. Operation of the logic circuit is initiated by the actuation of switch 72, which occurs when movable platen 26 is in the open position. The operation of switch 72 actuates solenoid valve 74, shifting it in the direction of arrow A. This completes the fluid circuit, thereby applying a logic 1 to the set input of flip-flop 76. Flip-flop 76, as well as the other flip-flops used in the logic circuit of the present invention, may be an ARO No. 59180 flip-flop. A logic 1 at the set input of flip-flop 76 produces a logic 1 at the set output. This causes fluid to flow from the supply into the flip-flop through the set output to the left hand side of cylinder 35, thereby shifting its piston in the direction indicated by arrow 1, which moves the carriage 16 to the left in FIG. 1. The movement of the piston of cylinder 35 actuates switch 78, which causes the activation of a pressure switch 80. The actuation of pressure switch 80 disables the molding machine, thereby preventing its operation during the removal of an article between the platens. The logic 1 output from flip-flop 76 is also applied to an input of OR element 81. The OR element 81 could, for example, be an ARO No. 59010 OR element. This produces a logic 1 at the output thereof causing the piston of cylinder 48 to move in the direction of arrow 1 which moves the gripper unit 18 to the left in FIG. 1. The logic 1 set output from flip-flop 76 is further applied to time delay circuit 83. The timed delay circuit 83 could, for example, be an ARO No. 59121 time delay circuit. After the expiration of a predetermined time period of the time delay, a logic 1 output is produced, and this is applied to the reset input of flip-flop 82. This produces a logic 1 output at the reset output, which allows the fluid from the supply to flow into the left hand side of cylinder 58, thereby shifting the piston in the direction of arrow 2, which opens the gripping elements 60. The switching of flip-flop 82 causes a logic 0 output to appear at the set output of flip-flop 82, which is applied to the control input of inhibitor 84. Inhibitor 84, as well as the other inhibitors used in the logic circuit, can for example, be ARO No. 59800 inhibitors. A logic 0 input at the control of the inhibitor causes a logic 1 output to appear at the output terminal, this being applied to the set input of flip-flop 86. This causes a logic 1 at the set output of flip-flop 86, which allows fluid from the supply to flow to the left hand side of cylinder 41, thereby shifting its piston in the direction of arrow 3, which moves gripper 18 down in FIG. 1. The switching of flip-flop 86 to produce a logic 1 at the set output also produces a logic 0 at the reset output. This is applied to the control input of inhibitor 88, which produces a logic 1 at the output thereof. This logic 1 is supplied to the reset input of flip-flop 76, causing it to switch and thereby producing a logic 1 at the reset output thereof. This causes the shifting of the piston of cylinder 35 in direction of arrow 4, which moves carriage 18 to the right in FIG. 1. When flip-flop 76 switches, a logic 0 is produced at the set output thereof. This is applied to the control input of NOT element 102, which produces a logic 1 at the output thereof. The NOT element may be, for example, an ARO No. 59112 NOT element. The logic 1 at the output of the NOT element shifts the piston of cylinder 48 in the direction of arrow 4, thereby moving the gripper 18 to the right in FIG. 1. The logic 1 still appearing at the output of inhibitor 84 is applied to switch 80 to disable the molding mechanism. Also, it is applied to the set input of flip-flop 90, causing a logic 1 at the set output thereof, which produces a rotation of the ROTAC 51, as indicated by the arrow 5, which corresponds to rotation about the axis of cylinder 41. The switching of flip-flop 90 to produce a logic 1 at the set output also causes a logic 0 at the reset output thereof. This is applied to the control input of inhibitor 92, which produces a logic 1 at its output. This logic 1 is applied to the set input of flip-flop 94, which produces a logic 1 at the set output, thereby causing the piston of cylinder 28 in the direction of arrow 6, which moves the carrier 12 to the right in FIG. 1. The switching of flip-flop 94 causes a logic 0 at the reset output thereof, which is applied to the input of inhibitor 96. This produces a logic 1 at the output thereof, which is applied to the set input of flip-flop 98. This causes a logic 1 at the set output thereof, which is applied to one of the inputs of OR element 81. A logic 1 at the input of the OR gate produces a logic 1 at its output, which is applied to the left hand side of cylinder 48, moving its piston in direction of arrow 7, which moves gripper 18 to the left in FIG. 1. The switching of flip-flop 98 causes a logic 0 at the reset output thereof, which is applied to the supply input of NOT element 102. This produces a logic 0 at the output thereof, which is applied to the control input of inhibitor 104, which in turn causes a logic 1 at the output thereof. This produces a logic 1 at the set input of flip-flop 82, which produces a logic 1 at its output. This causes the shift of the piston of cylinder 58 in the direction of arrow 8, which opens the gripping elements 60. The logic 1 at the output of flip-flop 82 is also applied to the input of inhibitor 84, producing a logic 0 at its output. This is applied to the input of inhibitor 106, producing a logic 1 at its output, which is applied to the reset input of flip-flop 98. This switches flip-flop 98, causing a logic 1 at the reset output thereof. This supplies fluid to NOT element 102, which causes the piston of cylinder 48 to shift in the direction of arrow 9, which moves the gripping unit 18 to the right in FIG. 1. The switching of flip-flop 98 also causes a logic 0 at the set output thereof, which is applied to the input of inhibitor 108. This produces a logic 1 at the inputs of flip-flops 94, 90 and 86 respectively, causing a logic 1 at the reset output of each of these flip-flops. This causes a shift of the pistons of cylinders 41 and 28 and the rotation of the ROTAC 51, in the directions indicated by the arrows 10. This causes respectively the movement of gripping unit 18 up, carrier 12 to the left and the rotation of the gripping unit 18 about the axis of cylinder 41.

From the above described operation, it is apparent that once the logic circuit is actuated by switch 72 which causes the movement of solenoid valve 74, the sequence of movement of the various components of the picker is controlled by the logic circuit. Thus, the movement is completely automatic.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. A picker for grippng and moving an article, comprising a mounting unit; a carrier carried by said mounting unit for movement along a first predetermined path; a first fluid actuated cylinder coupled between said mounting unit and said carrier for moving said carrier in opposite directions along said first predetermined path; carriage means slidably mounted on said carrier for movement along a second predetermined path perpendicular to said first predetermined path; a second fluid actuated cylinder coupled between said carrier and said carriage means for moving said carriage in opposite directions along said second predetermined path; gripping means mounted on said carriage means for movement along a third predetermined path perpendicular to said first and second predetermined paths; a third fluid actuated cylinder coupled between said carriage and said gripping means for moving said gripping means in opposite directions along said third predetermined path; said gripping means including a pair of gripping elements for gripping said article, said gripping elements having open and closed positions, operating means for moving said gripping elements between said open and closed positions, and a fourth fluid actuated cylinder for moving said gripping elements along a fourth predetermined path; and logic circuit means for controlling the operation of said first, second, third and fourth cylinders and said operating means, and rotating means coupled to said carriage means for rotating said gripping means about said third predetermined path.

2. A picker accordng to claim 1, wherein upon actuation, said logic circuit means controls the movement of said carrier, carriage means, and gripping means in a predetermined sequence, wherein said sequence is the movement of said carriage means in a first direction along said second predetermined path and simultaneously said gripping elements in a first direction along said fourth predetermined path, the closing of said gripping elements, the movement of said gripping means in a first direction along said third predetermined path, the movement of said carriage means in an opposite direction along said second predetermined path and simultaneously the movement of said gripping elements in the opposite direction along said fourth predetermined path, the rotation of said gripping means in a first direction about said third predetermined path, the movement of said carrier in a first direction along said first predetermined path, the movement of said gripping elements in said first direction along said fourth predetermined path, the opening of said gripping elements, the movement of said gripping elements in said opposite direction along said fourth predetermined path, and the simultaneous movement of said gripping means in the opposite direction along said third predetermined path, the movement of said carrier in the opposite direction along said first predetermined path and the rotation of said gripping means in an opposite direction about said third predetermined path.

3. A picker according to claim 1, wherein said operating means includes a fifth fluid actuated cylinder responsive to said logic circuit means for moving said gripping elements between said open and closed positions.

4. A picker according to claim 1, wherein said carrier is comprised of an elongated open frame housing having a pair of guide rods extending between its opposite ends, said carriage being carried by said guide rods for slidable movement therealong.

5. A picker according to claim 4, wherein said carriage means comprises a carriage member; a bar extending therefrom; a first plate member coupled to said bar; a second plate member; at least two laterally spaced first guide rods extending between said first and second members; and at least one second guide bar extending from said second plate member; wherein said third cylinder is coupled between said first and second plate members and said gripping means is coupled to said second guide rod and wherein rotating means rotates said bar, thereby rotating said gripping means.

6. An apparatus for retrieving an article from between the mold platens of a molding machine, one of which platens is movable comprising a mounting unit on said molding machine; a carrier carried by said mounting unit for movement along a first predetermined path perpendicular to the direction of movement of said movable platen; a first fluid actuated cylinder coupled between said mounting unit and said carrier for moving said carrier in opposite directions along said first predetermined path; carriage means slidably mounted on said carrier for movement along a second predetermined path perpendicular to said first predetermined path; a second fluid actuated cylinder coupled between said carrier and said carriage means for moving said carriage in opposite directions along said second predetermined path; gripping means mounted on said carriage means for movement along a third predetermined path perpendicular to said first and second predetermined paths; a third fluid actuated cylinder coupled between said carriage and said gripping means for moving said gripping means in opposite directions along said third predetermined path; said gripping means including a pair of gripping elements for gripping said article, said gripping elements having open and closed positions, operating means for moving said gripping elements between said open and closed positions, and a fourth fluid actuated cylinder for moving said gripping elements along a fourth predetermined path; logic circuit means for controlling the operation of said first, second, third and fourth cylinders and said operating means and actuator means positioned with respect to said movable platen for actuating said logic circuit means when said movable platen is in an open position.

7. An apparatus accordng to claim 6, wherein when said movable platen is in an open position, thereby initiating operation of said logic circuit means, said logic circuit means controls the movement of said carrier, carriage means, and gripping means in a predetermined sequence, wherein said sequence is the movement of said carriage means in a first direction along said second predetermined path and simultaneously said gripping elements in a first direction along said fourth predetermined path, the opening of said gripping elements, the movement of said gripping means in a first direction along said third predetermined path, the movement of said carriage means in an opposite direction along said second predetermined path and simultaneously the movement of said gripping elements in the opposite direction along said fourth predetermined path, the movement of said carrier in a first direction along said first predetermined path, the movement of said gripping elements in said first direction along said fourth predetermined path, the opening of said gripping elements, the movement of said gripping elements in said opposite direction along said fourth predetermined path, and the simultaneous movement of said gripping means in the opposite direction along said third predetermined path and said carrier in the opposite direction along said first predetermined path.

8. An apparatus according to claim 6, further including rotating means coupled to said carriage means for rotating said gripping means about said third predetermined path.

9. A picker according to claim 8, wherein upon actuation by said actuating means, said logic circuit means controls the movement of said carrier, carriage means, and gripping means in a predetermined sequence, wherein said sequence is the movement of said carriage means in a first direction along said second predetermined path and simultaneously said gripping elements in a first direction along said fourth predetermined path, the closing of said gripping elements, the movement of said gripping means in a first direction along said third predetermined path, the movement of said carriage means in an opposite direction along said second predetermined path and simultaneously the movement of said gripping elements in the opposite direction along said fourth predetermined path, the rotation of said gripping means in a first direction about said third predetermined path, the movement of said carrier in a first direction along said first predetermined path, the movement of said gripping elements in said first direction along said fourth predetermined path, the opening of said gripping elements, the movement of said gripping elements in said opposite direction along said fourth predetermined path, and the simultaneous movement of said gripping means in the opposite direction along said third predetermined path, the movement of said carrier in the opposite direction along said first predetermined path and the rotation of said gripping means in an opposite direction about said third predetermined path.

* * * * *